United States Patent Office 3,206,947
Patented Sept. 21, 1965

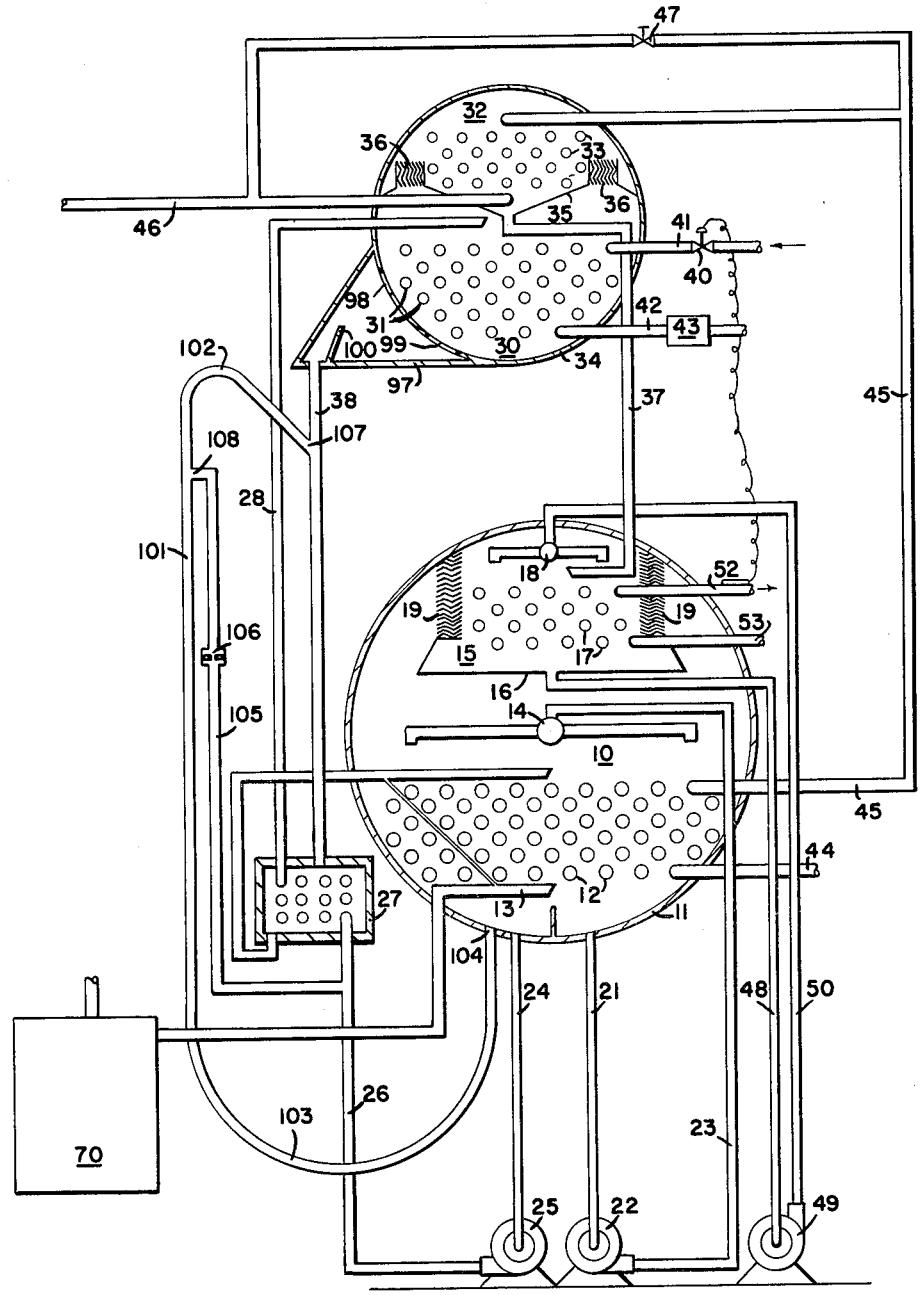

3,206,947
ABSORPTION REFRIGERATION SYSTEMS
Joseph R. Bourne and Louis H. Leonard, Jr., De Witt,
N.Y., assignors to Carrier Corporation, Syracuse, N.Y.,
a corporation of Delaware
Filed May 28, 1962, Ser. No. 197,946
11 Claims. (Cl. 62—489)

This invention relates to absorption refrigeration systems, and more particularly, to a construction and method of operating an absorption refrigeration system in order to substantially prevent the system from becoming totally inoperative due to solidification of absorbent solution.

In an absorption refrigeration machine, cool, relatively weak absorbent solution is normally passed from an absorber section where it is diluted by the absorption of refrigerant to a generator section where the refrigerant is boiled off and the absorbent solution is concentrated. The hot, relatively strong absorbent solution is then returned to the absorber section for reuse therein. In order to improve the efficiency of the system, it is normal practice to provide a heat exchanger for transferring heat between the hot strong solution returned to the absorber section and the cool, weak solution passed to the generator section. The heat exchanger serves to preheat the solution which is to be heated in the generator section and to precool the solution which is to be cooled in the absorber section.

Occasionally, difficulty is experienced in systems of the type described due to the fact that the strong absorbent solution returned from the generator section to the absorber section is cooled in the heat exchanger below the saturation point of the solution. This circumstance may develop, for example, if too much heat is supplied to the generator section, or if the cooling water supplied to the absorber section is unexpectedly cold. These two conditions are particularly likely to occur during periods of light refrigeration load, such as during wintertime. In addition, solidification may occur due to malfunction of various controls, such as steam valves, or during a sudden electrical power failure when the refrigeration system is in operation. This solidification generally occurs in the passages of the solution heat exchanger through which the highly concentrated absorbent solution from the generator flows.

When solidification of absorbent solution occurs in the solution heat exchanger, the passage for strong solution through the heat exchanger is blocked and the strong solution is prevented from being returned to the absorber section from the generator section. This occurrence may result in the weak solution being overcooled in the absorber section, which in turn results in further solidification of strong solution in the solution heat exchanger, as the overcooled weak solution is passed through it to the generator section. Eventually, the level of solution in the absorber section may be lowered to the point that the solution pump, which forwards weak solution to the generator section, may run dry damaging the pump. In addition, the solution level in the generator section may rise to a point where the absorbent solution enters the condenser section and flows into the evaporator pan, thereby impairing the capacity of the machine for a period of time after the solution heat exchanger is desolidified.

In order to prevent solidification of strong solution in the solution heat exchanger from rendering the machine totally inoperative, a bypass passage may be provided which passes the excess solution from the generator section around the solution heat exchanger to the absorber section. This permits the absorption refrigeration system to operate at least at partial capacity and efficiency when the solution heat exchanger is blocked due to solidification. This bypassing of solution also prevents the accumulation of excess solution in the generator section and prevents running the solution pump dry. At the same time, the bypass inhibits further solidification in the solution heat exchanger and tends to aid in desolidification because the weak absorbent solution, which passes through the unblocked side of the heat exchanger from the absorber section, is warmed by the hot solution from the generator section, which is dumped directly into the absorber section by the bypass passage.

Since, however, the generator section normally operates at a higher pressure than the absorber section, the bypass passage must be provided with some means to prevent direct communication between these sections during periods of normal operation of the refrigeration system. It is convenient, therefore, to provide a liquid trap portion in the bypass line which serves the function of maintaining the pressure difference between the generator and absorber sections by providing a liquid vapor barrier in the trap. Unfortunately, however, past experience has demonstrated that, while the bypass passage is adequate to serve its intended function, once it has operated, the strong solution which remains in the trap portion tends to be cooled during periods of nonuse of the bypass passage, and solidification may take place in the trap. The operator of a normally functioning absorption refrigeration system is unaware that solidification has taken place in the trap, but when solidification again occurs in the solution heat exchanger, he finds that the bypass passage is unable to serve its intended function because the trap is blocked with solidified absorbent solution. Consequently, the refrigeration system malfunctions as if the bypass passage was not provided.

Accordingly, it is the principal object of this invention to provide a construction and a method of operating an absorption refrigeration system which prevents malfunctioning of the bypass passage due to solidification therein.

This and other objects of this invention are achieved by providing a suitable means to prevent solidification of absorbent solution in the bypass passage so that this passage remains open and able to protect the operation of the machine during periods of solidification in the solution heat exchanger.

In a preferred embodiment of this invention, a metered quantity of relatively weak solution may be continuously bled into the solution bypass passage at a suitable point in order to dilute the concentration of any strong solution which remains in the trap portion of the bypass passage. The weak solution serves to dilute the concentration of absorbent solution in the trap below the saturation point so that crystallization or solidification of the absorbent solution therein is prevented.

These and other readily perceivable objects of this invention will become clear by reference to the following detailed description of this invention and to the accompanying drawing wherein:

The figure is a schematic view, partially in cross-section, of an absorption refrigeration system in accordance with one embodiment of this invention, Referring generally to the drawing, there is shown an absorption refrigeration machine comprising an absorber section 10 within a shell 11. A plurality of heat exchange tubes 12 are provided within the absorber section. A purge line 13 leads from a suitable region of the absorber and serves to conduct noncondensible gases therefrom to a suitable purge unit 70. A spray header 14 is located above the absorber section.

Also disposed in shell 11 is an evaporator section 15 comprising a pan-like member 16 within which may be disposed a plurality of heat exchange tubes 17. A spray header 18 may be located above heat exchange tubes 17 for distributing refrigerant thereover. A plurality of eliminators 19 are provided to prevent entrained liquid refrigerant particles being carried from evaporator section 15 to absorber section 10. Evaporator section 15 is in communication with absorber section 10 through eliminators 19.

In operation, the system is evacuated to a low pressure by being purged of relatively noncondensible gases by a suitable purge unit 70 and a suitable refrigerant is sprayed over tubes 17 in evaporator section 15 while a suitable absorbent solution is sprayed over tubes 12 in absorber section 10. Refrigerant is vaporized in evaporator section 15 and passes through the eliminators into absorber section 10 where the refrigerant vapor is absorbed by the absorbent solution. The heat required to vaporize the refrigerant in evaporator section 15 is provided by the fluid passing through heat exchange tubes 17 which is thereby cooled, and this heat is carried with the vapor into absorber section 10 where it is given up to a cooling fluid passing through heat exchange tubes 12. Thus, the evaporation of refrigerant in evaporator section 15 produces a cooling or refrigeration effect on the fluid passing through heat exchange tubes 17 by removing heat therefrom to vaporize the refrigerant.

Line 21 is connected to solution recirculation pump 22 and serves to circulate absorbent solution of intermediate strength accumulated in one section of the lower portion of absorber section 10 through line 23 to spray header 14 in order to recirculate absorbent solution in the absorber. A line 24 leads from another section of the lower portion of absorber section 10 containing weak solution and weak solution pump 25 serves to pass the weak solution through line 26 and solution heat exchanger 27 through weak solution line 28 to generator section 30.

As used herein, the term "strong solution" refers to an absorbent solution strong in absorbing power and the term "weak solution" refers to absorbent solution weak in absorbing power. The term "intermediate strength solution" refers to a solution having a concentration intermediate that of strong solution and weak solution.

A suitable absorbent for a refrigeration system of the type described comprises a hygroscopic aqueous salt solution such as lithium bromide and water and a suitable refrigerant is water. The concentration of the strong solution leaving the generator may be about 65%.

The absorption of refrigerant vapor by absorbent solution in absorber section 10 dilutes the absorbent solution, reducing its absorptive power, and diminishes the refrigerant supply which must be replenished in order to maintain the refrigeration machine in operation. It is desirable, therefore, to concentrate the weak solution by separating it from the absorbed refrigerant and to return the refrigerant to the evaporator section and the concentrated absorbent solution to the absorber section. For this purpose, a generator section 30 and a condenser section 32 are provided.

Generator section 30 is located in shell 34 and comprises a plurality of heat exchange tubes 31 for placing steam or other heating fluid in heat exchange relation with solution in the generator. Also located within shell 34 is condenser section 32 comprising a pan-like member 35 within which is disposed a plurality of heat exchange tubes 33 for passing cooling water. Eliminators 36 are provided to prevent strong solution from being entrained in refrigerant vapor passed from generator section 30 to condenser section 32.

A line 37 leads from pan-like member 35 to evaporator section 15 and serves to return condensed refrigerant from the condenser section to the evaporator section. Strong solution return line 38 extends from generator section 30 through solution heat exchanger 27 to absorber section 10 and serves to return relatively hot, strong absorbent solution from the generator section to the absorber section while passing it in heat exchange relation with relatively cool, weak solution being forwarded to the generator for concentration thereof.

A steam inlet line 41 and a steam outlet line 42 having a suitable steam trap 43 may be provided to admit steam to heat exchange tubes 31 in order to boil off refrigerant vapor from weak solution supplied to the generator thereby concentrating the weak solution. Other heating medium may be employed, if desired, to heat solution in generator 30. A suitable steam valve 40 responsive to leaving chilled water temperature in line 52 is provided to control the refrigeration capacity produced by the system.

The vaporized refrigerant passes through eliminators 36 and is condensed in condenser 32. For this purpose, a cooling water inlet line 44 is connected to heat exchange tubes 12 in absorber section 10 through which the cooling water passes through line 45 to heat exchange tubes 33 in the condenser section. The cooling water is then discharged through line 46 and an appropriate bypass line and valve 47 may be provided to bypass cooling water around the condenser section, if desired.

A suitable recirculation line 48 and refrigerant recirculation pump 49 are provided to pass refrigerant from pan 16 of the evaporator section through line 50 to spray header 18 so that refrigerant may be sprayed over heat exchange tubes 17 to wet them and aid in cooling of the medium passing through heat exchange tubes 17. Lines 52 and 53 are provided to conduct a heat exchange fluid, such as water, through heat exchange tubes 17 to cool the fluid by the resulting heat exchange with the cooled refrigerant in evaporator 15. This cooled heat exchange fluid is then passed by a pump (not shown) to suitable remotely located heat exchangers to provide cooling in the desired regions.

In accordance with this invention, an extension 97 is provided on shell 34 which forms a portion of generator section 30. The area encompassed by extension 97 communicates with generator section 30 through apertures 98 and 99 formed in shell 34. A suitable weir 100 is provided extending in a generally vertical direction from the bottom of extension 97 to provide a predetermined height of solution in generator section 30 and strong solution return line 38 is connected to extension 97 at a point past weir 100 as shown in the drawing.

A suitable solution heat exchanger bypass line 101 is connected into strong solution return line 38 at a point 107 adjacent an upper portion thereof. As shown in the drawing, bypass line 101 may connect to return line 38 at a generally upwardly extending angle and then pass generally vertically downwardly to form an arched portion 102. Arched portion 102 serves to automatically initiate flow through bypass line 101 when return line 38 is blocked by solidification of absorbent solution in the strong solution passage portion of solution heat exchanger 27. It will be observed that as strong solution from generator section 30 overflows weir 100 and rises first in return line 38 and then in bypass line 101 to a point at or above a predetermined vertical height corresponding to and determined by the vertical height of arched portion 102, flow of absorbent solution through bypass line 101 is automatically initiated.

Bypass line 101 is provided with a lower, trap portion 103 which is generally below the level of absorber section 10 and which terminates in an upwardly extending portion in communication with absorber section 10 through shell 11 at point 104. Trap portion 103 is provided to hold a quantity of liquid so that the normal pressure difference existing between generator section 30 and absorber section 10 is maintained by the liquid barrier to flow of gas between the sections in bypass line 101. It will be understood that the vertical extent of trap portion 103 below absorber section 10 will be determined in part by the liquid head required to maintain the predetermined desired difference in pressures between generator section 30 and absorber section 10.

A liquid line 105 extends from a point upstream of weak solution pump 25 to a suitable point 108 adjacent an upper portion of bypass line 101 above trap portion 103. A suitable metering device 106 may be provided in series with line 105 in order to meter the quantity of weak solution passed to trap portion 103.

It will be understood that the described embodiment illustrates only one of a number of suitable means for passing liquid to trap portion 103 and that other liquids which do not tend to solidify at the temperatures to which trap portion 103 is likely to cool, such as weak absorbent solution including chilled water or refrigerant water, as well as other nonsaturated solutions, may, if desired, be utilized to dilute or flush strong solution remaining in trap portion 103. Likewise, metering means 106 may be omitted if desired, but its inclusion is desirable in order to limit any adverse effect on the refrigeration system due to the quantity of liquid supplied to bypass line 101 and passed through trap portion 103 into absorber section 10. For example, in the embodiment illustrated, metering device 106 may comprise merely a restricted length of tubing, so designed as to provide a continuous flow of approximately 1/10 to 1 gallon per minute of weak solution into bypass line 101. If desired, means may be provided to supply liquid to trap 103 only intermittently such as after use of bypass passage 101 to dilute or flush strong solution therein.

In operation, trap portion 103 is filled with a suitable liquid such as refrigerant water, or weak absorbent solution, and the refrigeration system is assumed to be operating normally. Under these conditions, weak solution is passed from absorber section 10 through weak solution line or passage 28 including solution heat exchanger 27 to generator section 30 and strong solution is returned from generator section 30 through the normal strong solution return line or passage 38, including a strong solution passage in solution heat exchanger 27, to absorber section 10.

If, due to some condition such as previously described, the strong solution in heat exchanger 27 is cooled below the saturation point and crystallizes or solidifies in the strong solution passage of the heat exchanger, it will be seen that the normal passage for return of strong solution from generator section 30 to absorber section 10 will be blocked off. In this event, it will also be apparent that the level of strong solution will begin to rise into arched portion 102 of bypass line 101 after return line 38 becomes filled with solution. When the level of strong solution rises to a vertical height determined by the height of arched portion 102, the strong solution will then be bypassed around the strong solution passage in solution heat exchanger 27 directly through trap portion 103 into absorber section 10. The absorption refrigeration machine will, therefore, be maintained in operation at least on a part capacity level of operation.

Suitable signal means (not shown) may be provided, if desired, to indicate to the operator that solution is flowing through bypass line 101, indicating solidification has taken place in heat exchanger 27. After desolidification of heat exchanger 27 by any suitable means, which is well understood in the art, passage of strong solution through return line 38 will be restored and strong solution will automatically cease to flow through bypass line 101.

Relatively weak solution is then passed under the pressure of weak solution pump 25 through liquid line 105 in a quantity determined by metering device 106 into bypass line 101 and trap portion 103. This quantity of weak solution serves to dilute the concentration of strong solution in trap portion 103 below the saturation point to prevent solidification therein. It will be seen that a small quantity of weak solution may continually pass through bypass line 101 into absorber section 10 in an amount which does not impair the function of the refrigeration system. Alternatively, any other suitable liquid may be either continuously or intermittently supplied to trap portion 103 to flush or dilute any strong absorbent solution remaining therein after operation of bypass line 101 in order to prevent solidification and blockage of the bypass line upon cooling of the solution therein.

It will be understood that the illustrated embodiment achieves the desired objects of this invention by diluting or flushing strong solution in the trap portion of the bypass line with a relatively weak solution which does not tend to solidify upon normal cooling. However, other suitable means may be utilized to maintain the concentration of absorbent salt in line 101 below the saturation point, if desired. For example, the trap portion may be suitably jacketed with an electric or steam heated member in order to maintain the temperature of the absorbent solution therein above the point at which the solution solidifies. However, dilution of the absorbent solution in the trap portion, as illustrated in the drawing, is preferred because the solution need not be maintained at any particular temperature during shutdown of the machine or during a power failure and, consequently, the preferred protection means illustrated is highly reliable.

Other modifications and embodiments of this invention will become apparent to those skilled in the art and these modifications and embodiments are intended to be encompassed within the scope of the following claims.

We claim:

1. An absorption refrigeration system adapted to contain an absorbent solution comprising an absorber section, an evaporator section, a condenser section, a generator section, passage means for weak solution passing relatively weak absorbent solution from the absorber section to the generator section, strong solution passage means for passing relatively strong absorbent solution from the generator section to the absorber section, heat exchanger means for passing weak solution passing to said generator section in heat transfer relation with strong solution passing to said absorber section, and a bypass passage for bypassing relatively strong absorbent solution from said generator section around said heat exchanger means to said absorber section in the event of retardation of flow of absorbent solution through said strong solution passage means, and means connected to said by-pass passage to pass into said by-pass passage a liquid to inhibit blockage therein due to solidification of solution.

2. An absorption refrigeration system adapted to contain an absorbent solution and comprising: an absorber section, a generator section, an evaporator section, and a condenser section, each connected to provide refrigeration; passage means to pass relatively weak absorbent solution from said absorber section to said generator section; passage means to pass relatively strong absorbent solution from said generator section to said absorber section; and heat exchange means for providing heat transfer between strong solution passed to said absorber section and weak solution passed to said generator section; bypass passage means to bypass relatively strong solution from said generator section around said heat exchange means to said absorber section in the event of retardation of flow of absorbent solution in said heat exchange means; and means to inhibit solidification of absorbent solution in said bypass means during periods when solution from the generator is not passing therethrough comprising means to pass additional liquid through said bypass means in a quantity sufficient to substantially inhibit solidification of absorbent solution therein.

3. An absorption refrigeration system as defined in claim 2 wherein the means to inhibit solidification includes means for passing relatively weak absorbent solution through said bypass means to dilute the concentration of any relatively strong solution therein.

4. An absorption refrigeration system as defined in claim 3 wherein said weak solution is continuously passed through said bypass means during operation of said system.

5. An absorption refrigeration system comprising an absorber section, an evaporator section, a generator section, a condenser section, passage means for passing relatively weak absorbent solution from said absorber section to said generator section, passage means for passing relatively strong solution from said generator section to said absorber section, heat exchange means for transferring heat between weak absorbent solution passing to said generator section and strong absorbent solution passing to said absorber section, bypass passage means for bypassing strong solution around said heat exchange means to said absorber section in the event of retardation of flow of absorbent solution in a strong solution passage of said heat exchanger, said bypass passage including a trap portion for retaining absorbent solution therein to maintain a desired pressure difference between said generator section and said absorber section, and passage means for supplying a liquid to said trap portion to dilute any strong solution remaining therein after use of said bypass passage so as to inhibit solidification of the strong solution therein and to maintain said bypass passage open for subsequent use thereof.

6. An absorption refrigeration system as defined in claim 5 wherein said bypass passage means includes an upwardly arched portion for automatically initiating flow in said bypass passage when said strong solution passage in said heat exchange means is blocked and the level of absorbent solution treated by said generator section exceeds a predetermined height substantially determined by the height of said upwardly arched portion.

7. An absorption refrigeration system as defined in claim 5 wherein said liquid comprises relatively weak absorbent solution.

8. An absorption refrigeration system as defined in claim 5 wherein said system further includes a solution pump for passing relatively weak absorbent solution from said absorber section through said passage means to said generator section and wherein said means for supplying a liquid to said trap portion comprises a passage extending upstream from the discharge of said solution pump to said bypass passage at a point above said trap portion.

9. A method of inhibiting malfunctioning, due to solidification of absorbent solution, at a predetermined location in a normal passage extending between a generator section and an absorber section of an absorption refrigeration machine, said method comprising the steps of bypassing relatively strong absorbent solution from said generator section around the region of solidification through a bypass passage to said absorber section during periods wherein normal flow of strong absorbent solution through said normal passage is blocked, discontinuing passage of said relatively strong solution through said bypass passage upon unblocking of said normal passage, and maintaining the concentration of absorbent solution in said bypass passage means below the saturation point during periods when solution from said generator is not passing through said bypass passage by passing a liquid into said bypass passage to dilute any strong solution remaining therein.

10. A method as defined in claim 9 wherein the solution in said bypass passage means is maintained below the saturation point by diluting strong solution remaining therein by passing relatively weak absorbent solution into said bypass passage.

11. A method as defined in claim 9 wherein the solution in said bypass passage means is maintained below the saturation point by continuously passing a quantity of solution through said bypass passage.

References Cited by the Examiner

UNITED STATES PATENTS

| 2,430,047 | 11/47 | Edberg | 62—148 |
| 2,670,608 | 3/54 | Hainsworth | 62—148 |
| 2,749,095 | 6/56 | Anderson et al. | 62—485 |
| 2,814,468 | 11/57 | Berry | 165—62 |
| 2,818,234 | 12/57 | Berry | 165—62 |
| 3,038,321 | 6/21 | Merrick | 62—489 X |
| 3,053,056 | 9/62 | Leonard | 62—489 X |

ROBERT A. O'LEARY, *Primary Examiner.*

EDWARD J. MICHAEL, *Examiner.*

UNITED STATES PATENT OFFICE
CERTIFICATE OF CORRECTION

Patent No. 3,206,947　　　　　　　　　　　　　　　　September 21, 1965

Joseph R. Bourne et al.

It is hereby certified that error appears in the above numbered patent requiring correction and that the said Letters Patent should read as corrected below.

Column 6, line 31, strike out "passage means for weak solution passing" and insert instead -- weak solution passage means for passing --.

Signed and sealed this 24th day of January 1967.

(SEAL)
Attest:

ERNEST W. SWIDER　　　　　　　　　　　　　　　　EDWARD J. BRENNER
Attesting Officer　　　　　　　　　　　　　　　　Commissioner of Patents